US012085265B2

(12) United States Patent
Facchini

(10) Patent No.: US 12,085,265 B2
(45) Date of Patent: Sep. 10, 2024

(54) LED LIGHTING SYSTEM FOR RETROFITTING EXISTING LANTERN-STYLE LAMPS

(71) Applicant: Litek America Corp., Brooklyn, NY (US)

(72) Inventor: Fabio Facchini, Santarcangelo di Romagna (IT)

(73) Assignee: Litek America Corp., Brooklyn, NY (US)

( * ) Notice: Subject to any disclaimer, the term of this patent is extended or adjusted under 35 U.S.C. 154(b) by 0 days.

(21) Appl. No.: 17/674,054

(22) Filed: Feb. 17, 2022

(65) Prior Publication Data

US 2023/0417400 A1 Dec. 28, 2023

(51) Int. Cl.

| | |
|---|---|
| ***F21V 17/02*** | (2006.01) |
| ***F21V 19/00*** | (2006.01) |
| ***F21V 21/34*** | (2006.01) |
| ***F21V 23/00*** | (2015.01) |
| ***F21V 29/74*** | (2015.01) |
| *F21Y 115/10* | (2016.01) |

(52) U.S. Cl.

CPC ............ *F21V 23/003* (2013.01); *F21V 17/02* (2013.01); *F21V 19/004* (2013.01); *F21V 21/34* (2013.01); *F21V 29/74* (2015.01); *F21Y 2115/10* (2016.08)

(58) Field of Classification Search

CPC ........ F21V 17/02; F21V 17/34; F21V 17/162; F21V 19/004; F21V 21/14; F21V 21/34; F21K 9/23; F21K 9/232

See application file for complete search history.

(56) References Cited

U.S. PATENT DOCUMENTS

| | | | | |
|---|---|---|---|---|
| 1,625,100 A * | 4/1927 | Runge | F21V 21/26 | 248/295.11 |
| 1,631,209 A * | 6/1927 | Jewell | F21V 21/14 | 292/306 |
| 3,831,894 A * | 8/1974 | Newton, II | F21V 21/34 | 248/327 |
| 4,956,757 A * | 9/1990 | Wang | F21V 21/34 | 362/249.14 |
| 5,354,030 A * | 10/1994 | Harwood | F21V 21/34 | 362/396 |
| 8,123,382 B2 * | 2/2012 | Patrick | F21V 29/85 | 362/249.02 |
| 8,449,145 B1 * | 5/2013 | Berry | F21V 21/34 | 362/249.02 |
| 9,400,094 B2 * | 7/2016 | Wakahara | F21V 21/14 | |
| 10,393,354 B2 * | 8/2019 | Schneider | F21V 21/104 | |

(Continued)

*Primary Examiner* — Ismael Negron

(74) *Attorney, Agent, or Firm* — Tarter Krinsky & Drogin LLP

(57) ABSTRACT

A lighting system includes a support bar, a light emitting diode (LED) assembly, and LED driver. The LED assembly further includes at least one light emitting diode mounted on a circuit board secured to a planar surface of a heat sink. Both the LED assembly and the LED driver are mounted on the support bar, and are configured to slide along and be fixed in various positions on the support bar by the use of torsion springs. Plates are provided at each end of the support bar, such plates configured to secure the lighting system by contacting supporting surfaces of an existing lantern. The lighting system can further include at least one diffuser coupled to the LED assembly.

19 Claims, 2 Drawing Sheets

(56) References Cited

U.S. PATENT DOCUMENTS

| | | | | |
|---|---|---|---|---|
| 2004/0095752 | A1* | 5/2004 | Hsu | F21S 8/04 362/147 |
| 2007/0183138 | A1* | 8/2007 | Cooper | F21V 21/03 362/453 |
| 2014/0119030 | A1* | 5/2014 | Ohai | F21V 1/00 362/311.01 |
| 2015/0009666 | A1* | 1/2015 | Keng | F21V 33/0096 362/249.02 |

* cited by examiner

LED LIGHTING SYSTEM FOR RETROFITTING EXISTING LANTERN-STYLE LAMPS

BACKGROUND

The present disclosure relates to a lighting system, and more particularly to a system for retrofitting existing lighting systems.

Many municipalities use lantern-style lamp posts to illuminate roadways, sidewalks, and public spaces. Typically, these lamp posts utilize more traditional lighting methods that need to be replaced frequently or consume a large amount of energy.

Lighting technology has greatly advanced. Once such advancement is the development of light emitting diodes (LED), which have a lower power consumption, longer life span, and are more efficient than existing discharge sources.

It is a desirable to provide the advantages of LEDs to existing lanterns without requiring the complete replacement of the existing lantern, while allowing for the adaptability within existing lanterns of various shapes and sizes.

SUMMARY

The object of the present disclosure is to provide a lighting system that serves as a replacement solution for upgrading traditional lanterns to utilize the advancements of LED technology, while also having the ability to adapt to various shapes and sizes of existing lanterns.

According to an embodiment of the present disclosure, a lighting system comprises a support bar configured to extend from an upper surface of an existing lantern to a bottom surface of an existing lantern.

The lighting system further includes a lighting module, which comprises a LED assembly and a LED driver assembly. The LED assembly comprises one or more LED circuit boards, one or more LEDs operatively connected to the one or more LED circuit boards, and one or more heat sinks. The LED circuit boards are secured onto a planar surface of the one or more heat sinks. The LED driver assembly comprises a LED driver configured to power the LED assembly. The LED driver is mounted on the support bar by securing the LED driver to one or more brackets, with screws placed through aligned securing openings of the LED driver and the brackets. The brackets and the heat sink include openings to accommodate the width of the support bar, which is configured to receive the lighting module comprising LED assembly and LED driver assembly. Because of the openings on the heat sink and brackets, the elements of the lighting module are able to slide along the support bar and be fixed in various positions along the support bar by one or more torsion springs.

According to another embodiment of the present disclosure, a lighting system comprises a support bar configured to extend from an upper surface of an existing lantern to a bottom surface of an existing lantern. The lighting system further includes a lighting module, which comprises a LED assembly and a LED driver. The support bar is configured to receive the lighting module, which can slide along the support bar and be fixed in various positions along the support bar by one or more torsion springs.

DETAILED DESCRIPTION

Reference will now be made in detail to an exemplary embodiment of the present disclosure. The embodiment described herein and shown in the figures is illustrative only and is not intended to limit the scope of the present disclosure. Changes may be made in the specific embodiment described in this specification and accompanying drawings that a person of ordinary skill in the art will recognize are within the scope and spirit of the present disclosure.

Figure 1:
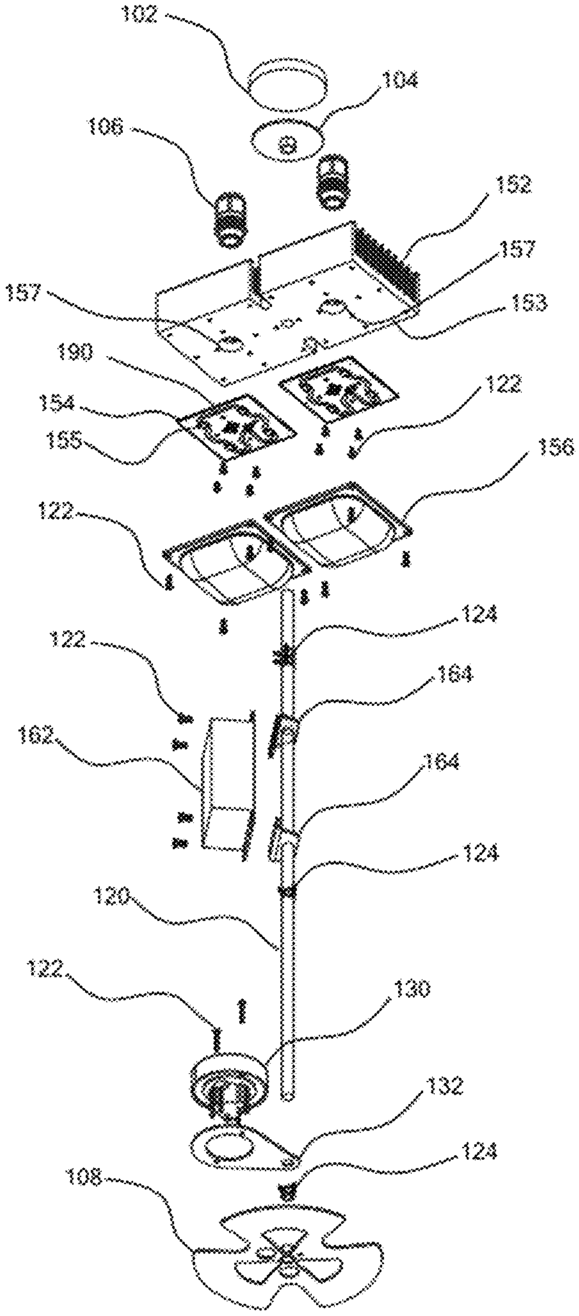
FIG. 1 illustrates an exploded view of an exemplary embodiment of a lighting system according to the present disclosure.
Figure 2:
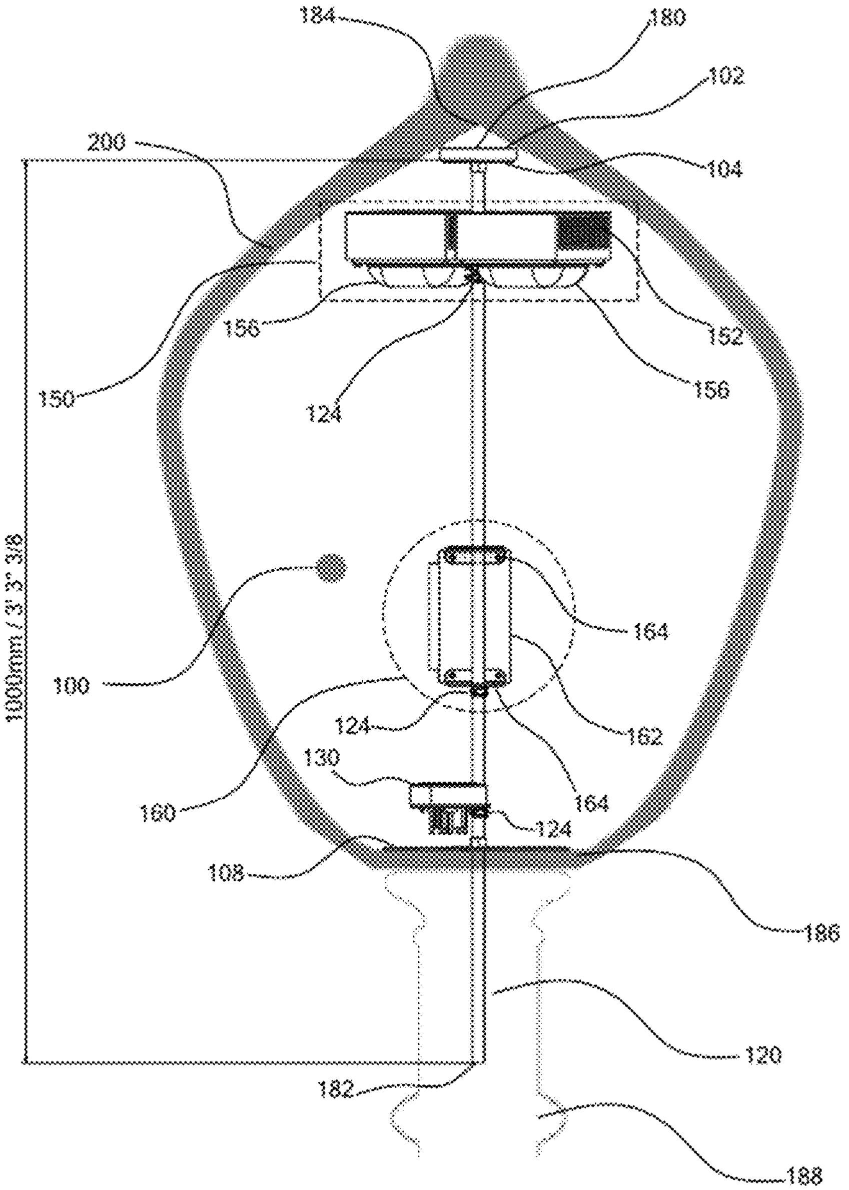
FIG. 2 illustrates an exemplary embodiment of the lighting system of FIG. 1.

Generally, as illustrated in FIGS. 1 and 2, a lighting system 100 of the present disclosure includes support bar 120 and a lighting module comprising LED assembly 150 and LED driver assembly 160. In certain embodiments, lighting system 100 can include one or more of the following support elements: a gasket 102, an upper plate 104, one or more cable glands 106, one or more screws 122, one or more torsion springs 124, and a bottom plate 108.

Support bar 120 of lighting system 100 is configured to extend from the upper surface 184 of an existing lantern 200, to at least the bottom surface 186 of the existing lantern 200. In certain embodiments, support bar 120 is one (1) meter in length. It is to be understood by one of ordinary skill in the art that if the height of the existing lantern 200 is less than the length of support bar 120 (e.g., less than one (1) meter), support bar 120 can extend past the bottom surface 186 and into the post 188 supporting the existing lantern 200, as shown in FIG. 2.

Upper plate 104 and bottom plate 108 have openings configured to receive the width of support bar 120, such that upper plate 104 and bottom plate 108 can be mounted on support bar 120. In certain embodiments, the inner surface of the openings of upper plate 104 and bottom plate 108 can be threaded. In such embodiments, a portion of a proximal end 180 and distal end 182 of support bar 120 can be threaded and configured to receive upper plate 104 and bottom plate 108, respectively.

In certain embodiments, upper plate 104 and bottom plate 108 are generally planar members comprised of a type of metal (e.g., aluminum) and can be circular in shape, have a propeller-like shape, or take on any other shape that would be known to a person of ordinary skill in the art.

Upper plate 104 and bottom plate 108 have a width greater than the width of support bar 120 in order to distribute the weight of the support bar 120 and other elements of lighting system 100 over a greater area and provide increased stability. Upper plate 104 is mounted at the proximal end 180 of support bar 120 and is lined with gasket 102. Gasket 102 can be composed of a material to allow thermal expansion (e.g., closed-cell rubber, polyethylene foam, etc.) between the upper surface 184 of the existing lantern 200 and upper plate 104. When lighting system 100 is assembled, gasket 102 comes into contact with the upper surface 184 of the existing lantern 200, providing increased stability between the existing lantern 200 and the lighting system 100. Bottom plate 108 is mounted at the distal end 182 of support bar 120 and comes into contact with the bottom surface 186 of the existing lantern 200.

Lighting module of lighting system 100 can include LED assembly 150 and LED driver assembly 160.

LED assembly 150 can include one or more LED circuit boards 154 upon which one or more LEDs 155 are secured. LEDs 155 can be secured onto LED circuit boards 154 in a variety of ways, such as, for example, soldering, welding, etc. In certain embodiments, the one or more LED circuit boards 154 can have an opening configured to receive the width of support bar 120, such that the one or more LED circuit boards 154 can slide along, and be positioned on, support bar 120.

In certain embodiments, in addition to one or more LED circuit boards 154 and one or more LEDs 155, LED assembly 150 can further include one or more heat sinks 152, constructed from a thermally conductive material (e.g., aluminum) to enhance the dissipation of heat generated by LEDs 155 during operation. In such embodiments, the one or more heat sinks 152 can have an opening configured to receive the width of support bar 120, such that the one or more heat sinks 152 can slide along, and be positioned on, support bar 120.

In an exemplary embodiment, a planar surface of heat sink 152 defines a mounting surface 153 upon which the underside 190 of one or more LED circuit boards 154 (i.e., sides opposite the LEDs 155) are secured. The one or more LED circuit boards 154 can be coupled to heat sink 152 via screws 122 fastened into securing openings on the one or more LED circuit boards 154 and aligned securing openings on mounting surface 153 of heat sink 152. In such embodiment, mounting surface 153 is configured to be thermally coupled to LEDs 155 through one or more LED circuit boards 154, and the remaining surface area of heat sink 152 defines a heat transfer path from the mounting surface 153 to the ambient environment.

In certain embodiments, the mounting surface 153 is a bottom planar surface of heat sink 152, such that when LED circuit boards 154 are secured on the mounting surface 153, LEDs 155 are directed downwards for increased illumination of the surrounding area below lighting system 100.

In embodiments where LED assembly 150 of lighting system 100 includes one or more heat sinks 152, cables can be coupled to wiring channels 157 of the one or more heat sinks 152 in any manner known to a person of ordinary skill in the art. For example, in certain embodiments, one or more cable glands 106 can be disposed within wiring channels 157 of the one or more heat sinks 152. Cable glands 106 can have one or more coupling features (e.g., mating threads) that allow cable glands 106 to create a seal between cable glands 106 and the heat sink 152. Cable glands 106 can also provide a seal between cable glands 106 and one or more cables (e.g., cables connecting LED driver 162 to LED circuit boards 154) that are disposed within the cable glands 106. Such seal can substantially prevent the intrusion of dust, water, debris, and/or other contaminants from entering heat sink 152.

In certain embodiments, LED assembly 150 can further include one or more diffusers 156 configured to evenly distribute the light emitted from the LEDs 155. Diffusers 156 are placed over the one or more LEDs 155 on the one or more LED circuit boards 154, and are secured to the one or more heat sinks 152 by one or more screws 122 placed through aligned securing openings on heat sink 152 and diffusers 156. Diffusers 156 can be made of a heat and impact resistant material (e.g., plastic) and can be manufactured to include light diffusing structures, such as ridges, dots, bumps, dimples, or other uneven surface on the interior portion of the diffuser 156.

In further accordance with the lighting system 100 of the present disclosure, the lighting module can also include LED driver assembly 160, comprising at least LED driver 162. LED driver 162 is configured to provide and maintain power to the LEDs 155 on LED circuit boards 154 by one or more cables connecting LED driver 162 to LED circuit boards 154 disposed through wiring channels 157 of heat sink 152. In certain embodiments, LED driver 162 can be powered with AC voltage by means of connecting LED driver 162 to an existing electrical cable of the existing lantern 200. In certain embodiments, LED driver 162 is an external driver, providing easy repair or replacement.

In certain embodiments, in addition to LED driver 162, LED driver assembly 160 can include one or more driver mounting brackets 164 configured to mount LED driver 162 on support bar 120. In such embodiments, one or more brackets 164 can have an opening configured to receive the width of support bar 120, such that brackets 164 can slide and be positioned on support bar 120. Brackets 164 are configured to hold LED driver 162 onto support bar 120 by screws 122 placed through aligned securing openings on LED driver 162 and one or more brackets 164. In alternate embodiments, LED driver 162 can have an opening configured to receive the width of support bar 120, such that LED driver 162, itself, can be mounted on support bar 120 without the use of one or more brackets 164.

In certain embodiments, LED assembly 150 and LED driver assembly 160 can be positioned and held in place on support bar 120 by one or more torsion springs 124. In such embodiments, the one or more torsion springs 124, when at rest (i.e., not mounted on support bar 120), can have an internal diameter less than the diameter of support bar 120. The internal diameter of the one or more torsion springs 124 can be increased by the application of an external force such that the internal diameter of the one or more torsion springs 124 increases and is greater than that of support bar 120, allowing support bar 120 to receive torsion springs 124. When torsion springs 124 are positioned on support bar 120, and when the external force is removed, the one or more torsion springs 124 return to their rest position (i.e., having a smaller internal diameter) causing the one or more torsion springs 124 to compress against support bar 120 and be held in place.

FIG. 2 illustrates an exemplary assembly of lighting system 100 according to the present disclosure.

In the illustrated embodiment of FIG. 2, each of the following elements of lighting system 100 can be provided with openings configured to permit support bar 120 to receive such elements when lighting system 100 is assembled: gasket 102, upper plate 104, heat sink 152, brackets 164, bottom plate 108, and torsion springs 124.

When lighting system 100 is assembled, distal end 182 of support bar 120 can be placed through the opening of bottom plate 108, which can be held on support bar 120 by, for example, frictional force, thread engagement, or any other manner known to a person of ordinary skill in the art. Torsion spring 124 can be placed and positioned on support bar 120 to support the lower-most one or more brackets 164 and prevent LED driver assembly 160, comprising the LED driver 162 and the one or more brackets 164, from sliding down support bar 120. LED driver 162 is secured onto one or more brackets 164 by one or more screws 122 through aligned securing openings on LED driver 162 and one or more brackets 164. Another torsion spring 124 can be placed onto support bar 120 to support and position LED assembly 150. Support bar 120 can be placed through the opening of heat sink 152. One or more LED circuit boards 154, upon which one or more LEDs 155 are secured, and one or more diffusers 156 to cover LED circuit boards 154, are coupled to a mounting surface 153 of heat sink 152 via one or more screws 122 through aligned securing openings on mounting surface 153 and diffusers 156 and LED circuit boards 154. Upper plate 104 and gasket 102 are positioned at a proximal end 180 of support bar 120, and are held on support bar 120, by, for example, frictional force, thread engagement, or any other manner known to a person of ordinary skill in the art.

A benefit of the present disclosure is realized by the use of one or more torsion springs 124. Torsion springs 124 permit the LED assembly 150 and LED driver assembly 160 to be easily positioned and fixed along support bar 120, allowing for the adaptability of the installation of lighting system 100 within different sizes and shapes of the existing lantern 200 in which lighting system 100 is installed.

In alternate embodiments, in addition to the elements of lighting system 100 previously disclosed, the lighting module of lighting system 100 can also include a NEMA/ANSI C136-compliant connector 130. In such embodiment, base 130 can be mounted to support bar 120 above bottom place 108 by a base holder 132 and secured by screws 122. Base holder 132 can be positioned and fixed into place on support bar 120 by a torsion spring 124.

In an exemplary embodiment, a lighting system 100 comprises a support bar 120 configured to extend from an upper surface 184 of an existing lantern 200 to a bottom surface 186 of an existing lantern 200. Lighting system 100 further includes a lighting module, which comprises a LED assembly 150 and LED driver assembly 160. According to the present embodiment, LED assembly 150 comprises one or more LED circuit boards 154, one or more LEDs 155 operatively connected to the one or more LED circuit boards 154, and one or more heat sinks 152. LED circuit boards 154 are secured onto a planar surface (e.g., mounting surface 153) of the one or more heat sinks 152. According to the present embodiment, LED driver assembly 160 comprises a LED driver 162 configured to power the LED assembly 150. The LED driver 162 is mounted on support bar 120 by securing LED driver 162 to one or more brackets 164 with screws 122 placed through aligned securing openings of LED driver 162 and one or more brackets 164. According to the present embodiment, brackets 164 and heat sink 152 include openings to accommodate the width of the support bar 120, which is configured to receive the lighting module comprising LED assembly 150 and LED driver assembly 160. The elements of the lighting module can slide along support bar 120 and be fixed in various positions along the support bar 120 by one or more torsion springs 124.

In certain embodiments, heat sink 152 can be comprised of a thermally conductive material (e.g., aluminum).

In certain embodiments, the lighting system 100 can further comprise an upper plate 104, a bottom plate 108, and a gasket 102, each of which have openings configured to accommodate the width of the support bar 120. In certain embodiments, upper plate 104 is configured to be mounted on a proximal end 180 of the support bar 120, bottom plate 108 is configured to be mounted on a distal end 182 of the support bar 120, and gasket 102 is configured to be mounted on the upper plate 104 and contact an upper surface 184 of an existing lantern 200. In certain embodiments, the gasket 102 can be comprised of a thermally expandable material.

In certain embodiments, the lighting system 100 can further comprise a NEMA/ANSI C136-compliant connector 130 and holder 132. In certain embodiments, the holder 132 can have an opening to accommodate the width of support bar 120.

In certain embodiments, the lighting system 100 can further comprise one or more diffusers 156 configured to evenly distribute light from the LEDs 155. In certain embodiments, the one or more diffusers 156 can be composed of a heat and impact resistant material.

In another exemplary embodiment, a lighting system 100 comprises a support bar 120 configured to extend from an upper surface 184 of an existing lantern 200 to a bottom surface 186 of an existing lantern 200. Lighting system 100 further includes a lighting module, which comprises a LED assembly 150 and LED driver 162. According to the present embodiment, support bar 120 is configured to receive the lighting module, and the lighting module can slide along support bar 120 and be fixed in various positions along the support bar 120 by one or more torsion springs 124.

In certain embodiments, LED driver 162 of lighting system 100 can have an opening configured to accommodate the width of the support bar 120. In alternate embodiments, the lighting module can further comprise one or more driver mounting brackets 164 that have openings to accommodate the width of the support bar 120 and are configured to mount LED driver 162 onto support bar 120.

In certain embodiments, the lighting system 100 can further comprise an upper plate 104, a bottom plate 108, and a gasket 102, each of which have openings configured to accommodate the width of the support bar 120. In certain embodiments, upper plate 104 is configured to be mounted on a proximal end 180 of the support bar 120, bottom plate 108 is configured to be mounted on a distal end 182 of the support bar 120, and gasket 102 is configured to be mounted on the upper plate 104 and contact an upper surface 184 of an existing lantern 200. In certain embodiments, the gasket 102 can be comprised of a thermally expandable material.

In certain embodiments, the LED assembly 150 of lighting system 100 can comprise one or more LED circuit boards 154 and one or more LEDs 155 operatively connected to the one or more LED circuit boards 154.

In certain embodiments, the one or more LED circuit boards 154 can have an opening configured to accommodate the width of the support bar.

In certain embodiments, in addition to one or more LED circuit boards 154 and one or more LEDs 155, the LED assembly 150 of lighting system 100 further comprises one or more heat sinks 152.

In certain embodiments, LED circuit boards 154 can be secured onto a planar surface (e.g., mounting surface 153) of the one or more heat sinks 152.

In certain embodiments, the one or more heat sinks 152 can have an opening configured to accommodate the width of the support bar.

In certain embodiments, the one or more heat sinks 152 can be comprised of a thermally conductive material (e.g., aluminum).

In certain embodiments, the lighting system 100 can further comprise a NEMA/ANSI C136-compliant connector 130 and holder 132. In certain embodiments, the holder 132 can have an opening to accommodate the width of support bar 120.

In certain embodiments, the lighting system 100 can further comprise one or more diffusers 156 configured to evenly distribute light from the LEDs 155. In certain embodiments, the one or more diffusers 156 can be composed of a heat and impact resistant material.

Although the present disclosure has been described in relation to a particular embodiment thereof, many other variations and modifications and other uses will become apparent to those skilled in the art. The present disclosure therefore should not be limited by the specific disclosure herein, but only by the appended claims.

What is claimed is:

1. A lighting system configured to be coupled to upper and bottom surfaces of an existing lantern, the lighting system comprising:

a support bar;

a light emitting diode (LED) assembly, comprising one or more circuit boards, one or more light emitting diodes operatively connected to the one or more circuit boards, and one or more heat sinks having a planar surface, wherein the one or more circuit boards are secured onto the planar surface of the heat sinks; and an LED driver assembly, comprising a LED driver configured to power the LED assembly; and one or more driver mounting brackets, wherein the LED driver is mounted onto the support bar by the driver mounting brackets; and a plurality of torsion springs, wherein the driver mounting brackets and the heat sinks include openings to accommodate the width of the support bar, such that the LED assembly and the LED driver assembly are slideable along the support bar, and fixed in various positions on the support bar by the torsion springs.

2. The lighting system of claim 1, further comprising one or more diffusers configured to evenly distribute light from the LEDs.

3. The lighting system of claim 1, further comprising an upper plate, a bottom plate, and a gasket, wherein the upper plate, bottom plate, and gasket have openings configured to accommodate the width of the support bar.

4. The lighting system of claim 3, wherein:

the upper plate is configured to be mounted on a proximal end of the support bar;

the bottom plate is configured to be mounted on a distal end of the support bar; and the gasket is configured to be mounted on the upper plate and contact an upper surface of the existing lantern, when the lighting system is coupled with an existing lantern.

5. The lighting system of claim 1, further comprising a NEMA/ANSI C136.49-2021 compliant connector and holder.

6. The lighting system of claim 5, wherein the holder has an opening to accommodate the width of the support bar.

7. A lighting system configured to be coupled to upper and bottom surfaces of an existing lantern, the lighting system comprising:

a support bar;

a light emitting diode (LED) assembly;

an LED driver; and wherein the support bar is configured to receive the LED assembly and the LED driver, such that the LED assembly and the LED driver are slideable along the support bar, and fixed in various positions on the support bar by the torsion springs.

8. The lighting system of claim 7, wherein the LED driver is configured to power the LED assembly.

9. The lighting system of claim 7, wherein the LED driver has an opening configured to accommodate the width of the support bar.

10. The lighting system of claim 7, further comprising one or more driver mounting brackets that have openings to accommodate the width of the support bar, the one or more driver mounting brackets configured to secure the LED driver onto the support bar.

11. The lighting system of claim 7, further comprising an upper plate, a bottom plate, and a rubberized sponge, wherein the upper plate, bottom plate, and rubberized sponge have openings configured to accommodate the width of the support bar.

12. The lighting system of claim 11, wherein:

the upper plate is configured to be mounted on a proximal end of the support bar;

the bottom plate is configured to be mounted on a distal end of the support bar; and the rubberized sponge is configured to be mounted on the upper plate, and contact an upper surface of the existing lantern, when the lighting system is coupled with the existing lantern.

13. The lighting system of claim 7, further comprising a NEMA/ANSI C136.49-2021 compliant connector and holder.

14. The lighting system of claim 13, wherein the holder has an opening to accommodate the width of the support bar.

15. The lighting system of claim 7, wherein the LED assembly comprises:

one or more circuit boards; and one or more light emitting diodes operatively connected to the one or more circuit boards.

16. The lighting system of claim 15, wherein the one or more circuit boards has an opening configured to accommodate the width of the support bar.

17. The lighting system of claim 15, wherein the LED assembly further comprises one or more heat sinks.

18. The lighting system of claim 17, the heat sinks including a planar surface, wherein the one or more circuit boards are secured onto the planar surface of the heat sinks.

19. The lighting system of claim 17, wherein the heat sinks have an opening configured to accommodate the width of the support bar.

* * * * *